US010809554B2

(12) United States Patent
Park et al.

(10) Patent No.: US 10,809,554 B2
(45) Date of Patent: Oct. 20, 2020

(54) DISPLAY APPARATUS

(71) Applicant: SAMSUNG ELECTRONICS CO., LTD., Suwon-si (KR)

(72) Inventors: Yoon Ki Park, Suwon-si (KR); Nae Won Jang, Suwon-si (KR); Won Yeop Jang, Suwon-si (KR); Byoung Jin Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/431,171

(22) Filed: Jun. 4, 2019

(65) Prior Publication Data
US 2020/0050046 A1 Feb. 13, 2020

(30) Foreign Application Priority Data

Aug. 8, 2018 (KR) .................. 10-2018-0092413

(51) Int. Cl.
*F21V 21/00* (2006.01)
*G02F 1/1333* (2006.01)
*G02F 1/13357* (2006.01)
*F21V 8/00* (2006.01)

(52) U.S. Cl.
CPC ....... *G02F 1/133308* (2013.01); *G02B 6/005* (2013.01); *G02B 6/0085* (2013.01); *G02F 1/133606* (2013.01); *G02F 2001/133317* (2013.01); *G02F 2001/133607* (2013.01); *G02F 2001/133614* (2013.01)

(58) Field of Classification Search
CPC ........ G02B 1/133308; G02B 1/133606; G02B 2001/133317; G02B 2001/133607; G02B 2001/133614; G02B 6/005; G02B 6/0085

USPC ...... 362/561, 84, 97.1, 97.2, 97.3, 97.4, 633
See application file for complete search history.

(56) References Cited

U.S. PATENT DOCUMENTS

| 9,817,181 | B2 * | 11/2017 | Fan | G02F 1/133608 |
| 10,451,790 | B2 * | 10/2019 | Gotou | G02F 1/133621 |
| 2014/0319995 | A1 | 10/2014 | Kim et al. | |
| 2015/0009454 | A1 | 1/2015 | Nagatani et al. | |
| 2015/0185410 | A1 * | 7/2015 | Song | G02B 6/0091 349/65 |
| 2015/0331170 | A1 * | 11/2015 | Cheng | G02B 6/0026 362/607 |

(Continued)

FOREIGN PATENT DOCUMENTS

KR 10-2016-0095568 A 8/2016
KR 10-2018-0064126 A 6/2018

OTHER PUBLICATIONS

International Search Report (PCT/ISA/210), issued by International Searching Authority in corresponding International Application No. PCT/KR2019/007677, dated Oct. 21, 2019.

*Primary Examiner* — Laura K Tso
(74) *Attorney, Agent, or Firm* — Sughrue Mion, PLLC

(57) ABSTRACT

A display apparatus includes a display panel that displays an image, a light source that supplies light to the display panel, a middle mold positioned between the display panel and the light source, and a quantum dot sheet positioned between the display panel and the middle mold that converts a wavelength of light emitted from the light source, and the middle mold includes a color compensator having blue color that provides uniform white light to outside of the display panel.

20 Claims, 15 Drawing Sheets

(56) References Cited

U.S. PATENT DOCUMENTS

2016/0054624 A1* 2/2016 Cho ................. G02F 1/133605
349/58
2016/0223739 A1* 8/2016 Yoon .................... G02B 6/0088
2016/0291231 A1 10/2016 Jang et al.

* cited by examiner

DISPLAY APPARATUS

CROSS-REFERENCE TO RELATED APPLICATION(S)

This application is based on and claims priority under 35 U.S.C. § 119 to Korean Patent Application No. 10-2018-0092413, filed on Aug. 8, 2018, in the Korean Intellectual Property Office, the disclosure of which is incorporated by reference herein in its entirety.

BACKGROUND

1. Field

The disclosure relates to a display apparatus, and more particularly, to a display apparatus having an improved structure to increase the color uniformity.

2. Description of Related Art

A display apparatus is a type of output device that visually displays data information, such as characters and graphics, and images.

The display apparatus may include an emissive type display panel, such as an organic light emitting diode (OLED) panel, or a non-emissive type display panel, such as a liquid crystal display (LCD) panel.

The display apparatus provided with the non-emissive type display panel may include a backlight unit configured to supply light to the display panel.

The backlight unit may include a light source and an optical sheet configured to improve the optical properties of the light emitted from the light source. The optical sheet may include a quantum dot sheet.

A middle mold configured to support the optical sheet may be positioned between the non-emissive type display panel and the backlight unit. That is, the optical sheet may be positioned on the middle mold.

When the optical sheet including the quantum dot sheet is positioned on the middle mold, flashlighting or color deviation may occur on edges of the display panel corresponding to the light source. Flashlighting or color deviation may deteriorate the image quality of the display panel, resulting in complaints of consumers.

SUMMARY

Additional aspects of the present disclosure will be set forth in part in the description which follows and, in part, will be obvious from the description, or may be learned by practice of the present disclosure.

In accordance with an aspect of the disclosure, a display apparatus includes a display panel configured to display an image; a light source configured to supply light to the display panel; a middle mold positioned between the display panel and the light source; and a quantum dot sheet positioned between the display panel and the middle mold, the quantum dot sheet configured to convert a wavelength of light emitted from the light source, wherein the middle mold includes a color compensator having a blue color that is configured to provide uniform white light to outside of the display panel.

The middle mold may further include a middle mold frame, and wherein the color compensator may be positioned on the middle mold frame and may be in contact with the quantum dot sheet.

The middle mold may further include a middle mold body positioned between the display panel and the light source to cover the light source, the middle mold body extending in a width direction of the display panel, and wherein the color compensator may be positioned in the middle mold body.

The middle mold body may include: a first area; a second area extending from the first area to the inside of the display panel, and the second area may be stepped with respect to the first area; and a third area obliquely extending to the inside of the display panel from the second area, and wherein the color compensator may be provided in at least a part of the second area.

The color compensator may be provided across at least a part of the third area.

The color compensator may be formed by double injection molding.

The middle mold may further include a display panel counter surface facing the display panel, and the quantum dot sheet may be positioned on the display panel counter surface, and wherein the color compensator may be formed on at least a part of the display panel counter surface by using any one or any combination of coating, printing and adhesion.

The color compensator may be formed of a material in which resin and blue coloring agents are mixed with each other.

The resin may include any one or any combination of Polycarbonate (PC) resin, Acrylonitrile Butadiene Styrene (ABS) resin and Polybutylene Terephthalate (PBT) resin.

In accordance with an aspect of the disclosure, a display apparatus includes a display panel configured to display an image; a light source configured to supply light to the display panel; a middle mold positioned between the display panel and the light source, wherein the middle mold is configured to have a blue color to provide uniform white light to outside of the display panel; and a quantum dot sheet configured to convert a wavelength of light emitted from the light source.

The middle mold may be formed of a material in which resin and blue coloring agents are mixed with each other.

The resin may include any one or any combination of Polycarbonate (PC) resin, Acrylonitrile Butadiene Styrene (ABS) resin and Polybutylene Terephthalate (PBT) resin.

An entirety of the middle mold may have the blue color.

The quantum dot sheet may be positioned on the middle mold.

In accordance with an aspect of the disclosure, a display apparatus includes a display panel configured to display an image; a light source configured to supply light to the display panel; a middle mold positioned between the display panel and the light source; and a quantum dot sheet configured to convert a wavelength of light emitted from the light source, wherein the middle mold includes a middle mold frame; and a color compensator positioned to face the quantum dot sheet to provide uniform white light to outside of the display panel, and configured to have a light transmittance that is higher than a light transmittance of the middle mold frame.

The middle mold frame may be formed of an opaque material, and the color compensator may be formed of a semitransparent material.

The middle mold frame and the color compensator may be formed of a material in which resin and white coloring agents are mixed with each other, and wherein a content of the white coloring agents forming the color compensator may be less than a content of the white coloring agents forming the middle mold frame.

The resin may include any one or any combination of Polycarbonate (PC) resin, Acrylonitrile Butadiene Styrene (ABS) resin and Polybutylene Terephthalate (PBT) resin.

The quantum dot sheet may be positioned on the middle mold.

The color compensator may be positioned on the middle mold frame and may be in contact with the quantum dot sheet.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

It is an aspect of the present disclosure to provide a display apparatus having an improved structure to prevent flashlighting and color deviation by changing a structure of a middle mold.

Embodiments will be described more fully hereinafter with reference to the accompanying drawings. In the following detailed description, the terms of "front side", "rear side", "upper side", "lower side", "upper end", "lower end," and the like may be defined by the drawings, but the shape and the location of the component is not limited by the term.

A display apparatus is a device for displaying information, material, and data in the form of characters, graphics, graphs, and images. The display apparatus may include a television that is a telecommunication medium for transmitting moving images and image signals, and a monitor that is a computer output device.

Figure 1:
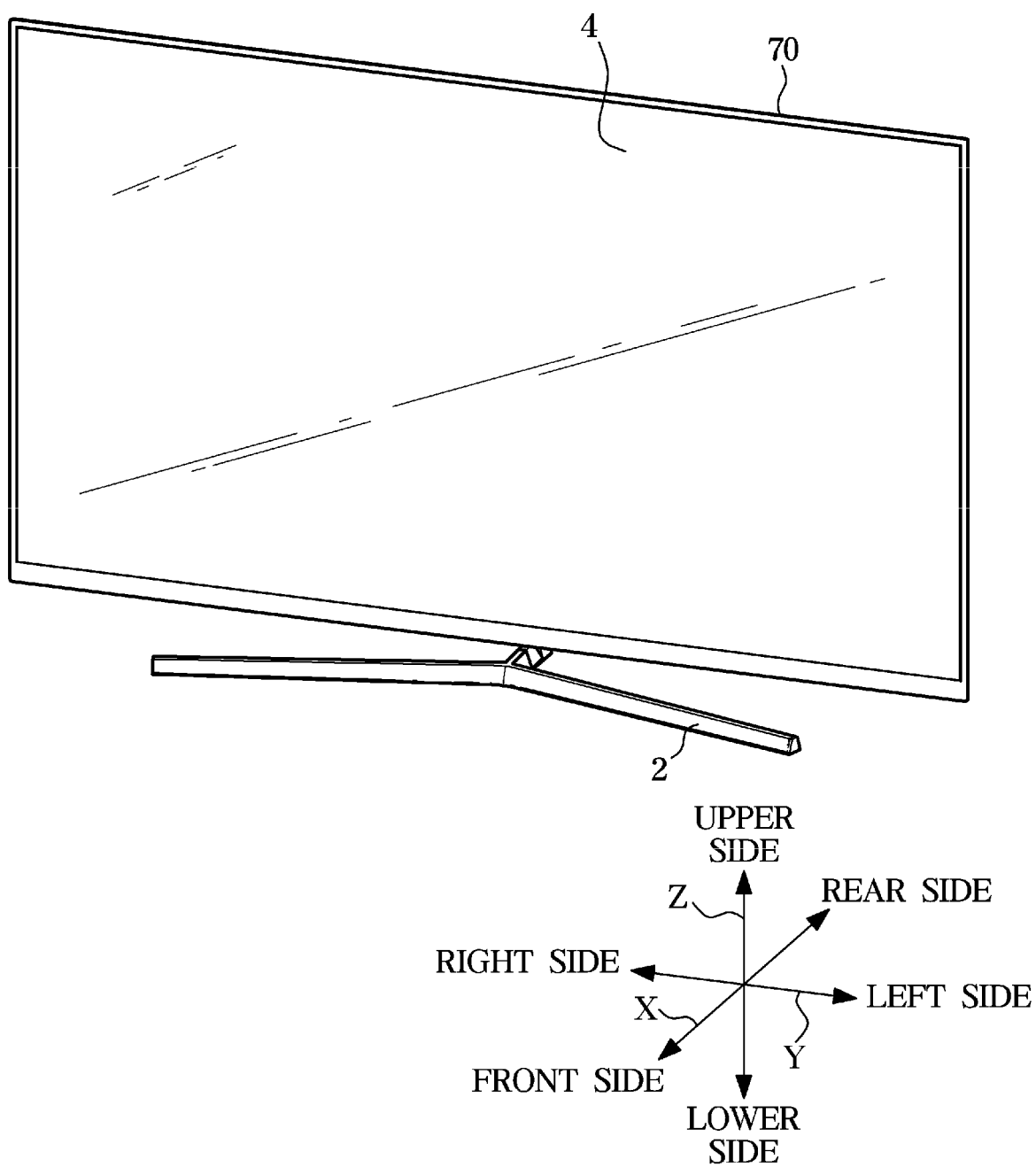
FIG. 1 is a view of a display apparatus according to an embodiment.

As illustrated in FIG. 1, the display apparatus may be a flat display apparatus having a flat screen. Alternatively, the display apparatus may be a curved display apparatus having a curved screen. In addition, the display apparatus may be a bendable display apparatus in which a screen is changed from a flat shape into a curved shape or from a curved shape into a flat shape, or in which a curvature of the screen is variable.

Hereinafter "X" represents the front-rear direction of a display apparatus 1 and 1a, "Y" represents the left-right direction or the width direction of the display apparatus 1 and 1a, and "Z" represents the up-down direction or the height direction of the display apparatus 1 and 1a.

Figure 2:
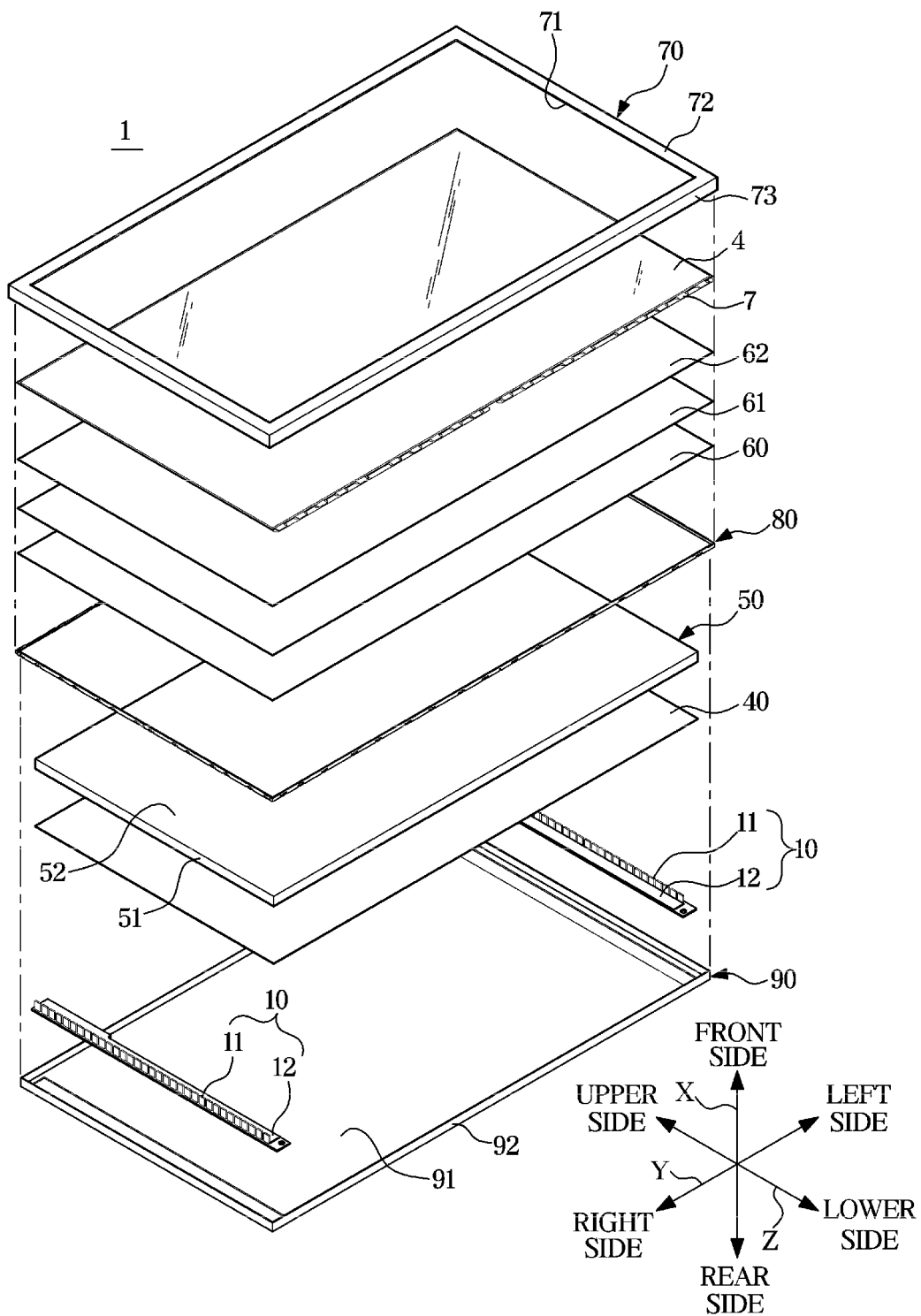
FIG. 2 is an exploded perspective view of the display apparatus according to an embodiment.

FIG. 1 is a view of a display apparatus according to an embodiment, and FIG. 2 is an exploded perspective view of the display apparatus according to an embodiment. FIGS. 1 and 2 will be described with reference to FIG. 3. For reference, in FIGS. 1 to 6, a display panel counter surface 82f may be used as a concept including a front surface of a middle mold 80, and particularly, a front surface of a middle mold body 82 and a front surface of a color compensator 100.

As illustrated in FIGS. 1 and 2, a display apparatus 1 may include a display panel 4 corresponding to a displaying portion of the display apparatus 1 for displaying an image, and a backlight unit emitting light to the display panel 4.

The display panel 4 may include a liquid crystal panel. The liquid crystal panel may display an image using a liquid crystal that exhibits optical properties according to changes in voltage and temperature. The liquid crystal panel may include a thin film transistor (TFT) substrate, a color filter substrate coupled to the thin film transistor substrate to face each other, and a liquid crystal injected between the thin film transistor substrate and the color filter substrate. The thin film transistor substrate may be a transparent substrate in which a thin film transistor as a switching element is formed in a matrix form, and the color filter substrate may be a transparent substrate in which RGB color pixels, which are color pixels expressing a predetermined color, are formed by a thin film process.

The display panel 4 may be connected to a signal transmission film 7 for receiving a data driving signal and a gate driving signal. The signal transmission film 7 may be formed in a chip on flexible printed circuit (COF) type in which a driving chip is mounted on a flexible circuit board.

The backlight unit may be positioned behind the display panel 4 and provide light to the display panel 4.

The backlight unit may be an edge type in which a light source 11 is positioned on any one or any combination of a plurality of long sides and a plurality of short sides of the display panel 4, or a direct type in which the light source 11 is positioned behind the display panel 4 to directly emit light to the display panel 4. A display apparatus 1a including the direct type backlight unit will be described with reference to FIG. 10.

The backlight unit may include a light source module 10 including the light source 11 and a printed circuit board 12 on which the light source 11 is mounted, and various optical members positioned on a path on which light emitted from the light source 11 is moved.

The light source 11 may be configured to supply light to the display panel 4. The light source 11 may include a light emitting diode (LED). The LED may be provided in a package in which a LED chip is mounted on a substrate and resin is filled. However, a cold cathode fluorescent lamp (CCFL) or an external electrode fluorescent lamp (EEFL) may be used as a light source.

On the printed circuit board 12, a plurality of light sources 11 may be mounted in a line along edges of the display panel 4. On the printed circuit board 12, a circuit pattern for transmitting driving power and signals to the light source 11 may be formed. The printed circuit board 12 may be positioned on a bottom chassis 90 described later.

The optical member may be positioned on the path, on which the light emitted from the light source 11 is moved, to guide a travel direction of the light or to improve the optical properties.

The optical member may include a reflector sheet 40 preventing the loss of the light by reflecting the light, a light guide plate 50 uniformly diffusing the light, which is emitted from the light source 11, to the display panel 4 side, and optical sheets 60, 61 and 62 improving the optical properties.

The reflector sheet 40 may reflect light, which is emitted from the light source 11, to be incident on a back surface of the light guide plate 50. The reflector sheet 40 may be formed in various shapes such as a sheet, a film, and/or a plate. For example, the reflector sheet 40 may be formed by coating a highly reflective material on a base material. The base material may include SUS, BRASS, aluminum, or PET. The highly reflective material may include silver or TiO 2.

The reflector sheet 40 may be seated and supported on the printed circuit board 12.

The light guide plate 50 may be made of Poly Methyl Methacrylate Acrylate (PMMA). The light guide plate 50 may be provided with a pattern for changing the light path. The light guide plate 50 may include an incident surface 51 on which light emitted from the light source 11 is incident. Further, the light guide plate 50 may include an exit surface 52 through which the light incident on the light guide plate 50 is moved toward the display panel 4. As for the edge type backlight unit as an embodiment, the light source 11 may be positioned to face a lateral side of the light guide plate 50. That is, the incident surface 51 of the light guide plate 50 may be formed on the lateral side of the light guide plate 50 facing the light source 11. The light incident on the incident surface 51 may be dispersed by patterns formed on the back surface of the light guide plate 50 and then transmitted through the exit surface 52 of the light guide plate 50.

The light guide plate 50 may be seated on the reflector sheet 40. The light guide plate 50 may be positioned such that the incident surface 51 of the light guide plate 50 is apart from the light source 11 by a predetermined distance in consideration with thermal expansion.

The optical sheets 60, 61 and 62 may be positioned in front of the light guide plate 50 to improve the properties of the light transmitted from the light guide plate 50.

The optical sheets 60, 61 and 62 may include a quantum dot sheet 60, a diffuser sheet 61, and a prism sheet 62.

The quantum dot sheet 60 may improve the color reproducibility by changing the wavelength of light. The color reproducibility is a measure to indicate how similar to natural color and a measure to indicate how large area can be displayed on color coordinates. The quantum dot sheet 60 may be configured to convert the wavelength of the light emitted from the light source 11. The quantum dot sheet 60 may be positioned to be supported on the middle mold 80. Particularly, the quantum dot sheet 60 may be positioned to be supported on the display panel counter surface 82*f* of the middle mold 80.

Inside the quantum dot sheet 60, quantum dots may be dispersed and the quantum dots may correspond to a few nanometers of the semiconductor crystal that is luminous. The quantum dots may receive blue light and may generate all the colors of visible light according to the size of the blue light. The smaller the quantum dot size, the shorter the wavelength of light, and the larger the quantum dot size, the longer the wavelength of light.

The diffuser sheet 61 may offset or minimize the pattern of the light guide plate 50. Because light guided through the light guide plate 50 directly enters the eye, the pattern of the light guide plate 50 is reflected on the eye without change, and thus the diffuser sheet 61 may offset or minimize the pattern of the light guide plate 50.

The prism sheet 62 may improve the brightness by focusing the light in which the brightness is significantly reduced by passing through the diffuser sheet 61. A dual brightness enhancement film (DBEF) may be used as the prism sheet 62.

However, the optical sheet may further include a protection sheet configured to protect optical sheets from external shocks or foreign substances. In addition, a composite sheet may be used, in which at least two of the quantum dot sheet 60, the diffuser sheet 61, and the prism sheet 62 are combined.

The optical sheet 60, 61 and 62 may be positioned between the light guide plate 50 and the display panel 4. Particularly, the optical sheet 60, 61 and 62 may be positioned between the light guide plate 50 and the display panel 4 and supported on the middle mold 80. More particularly, the optical sheet 60, 61 and 62 may be positioned between the light guide plate 50 and the display panel 4 and supported on the display panel counter surface 82*f* of the middle mold 80.

The display apparatus 1 may further include a chassis assembly configured to receive and support the display panel 4 and the backlight unit.

The chassis assembly may include a top chassis 70 and the middle mold 80 and the bottom chassis 90.

The top chassis 70 may include an opening 71 exposing the display panel 4, a bezel 72 supporting a front edge of the display panel 4, and a top chassis lateral portion 73 extending rearward from the bezel 72.

The middle mold 80 may be configured to support the display panel 4. Particularly, the middle mold 80 may be configured to support the display panel 4 and the optical sheet 60, 61 and 62. Further, the middle mold 80 may be configured to distinguish between the display panel 4 and the light source 11. A detailed description of the middle mold 80 will be described later.

The bottom chassis 90 may include a bottom portion 91 positioned behind the backlight unit, and a bottom lateral portion 92 extending forward from the bottom portion 91. The printed circuit board 12 of the light source module 10 may be seated on the bottom portion 91.

Various components of the display apparatus 1 such as the top chassis 70 and the middle mold 80 may be fixedly supported on the bottom chassis 90.

The bottom chassis 90 may function to dissipate heat, which is generated in the light source 11, to the outside. That is, the heat generated by the light source 11 may be transmitted to the bottom chassis 90 through the printed circuit board 12, and then the heat may be dissipated in the bottom chassis 90. To this, the bottom chassis 90 may be formed of various metal materials having good thermal conductivity such as aluminum and SUS, or plastic materials such as ABS. Further, an aluminum metal PCB having good thermal conductivity may be used as the printed circuit board 12.

However, any one or any combination of the top chassis 70, the middle mold 80, and the bottom chassis 90 may be integrally formed with remaining other components among the top chassis 70, the middle mold 80, and the bottom chassis 90.

The display apparatus 1 may further include a housing configured to surround the chassis assembly to protect and receive the chassis assembly.

Figure 3:
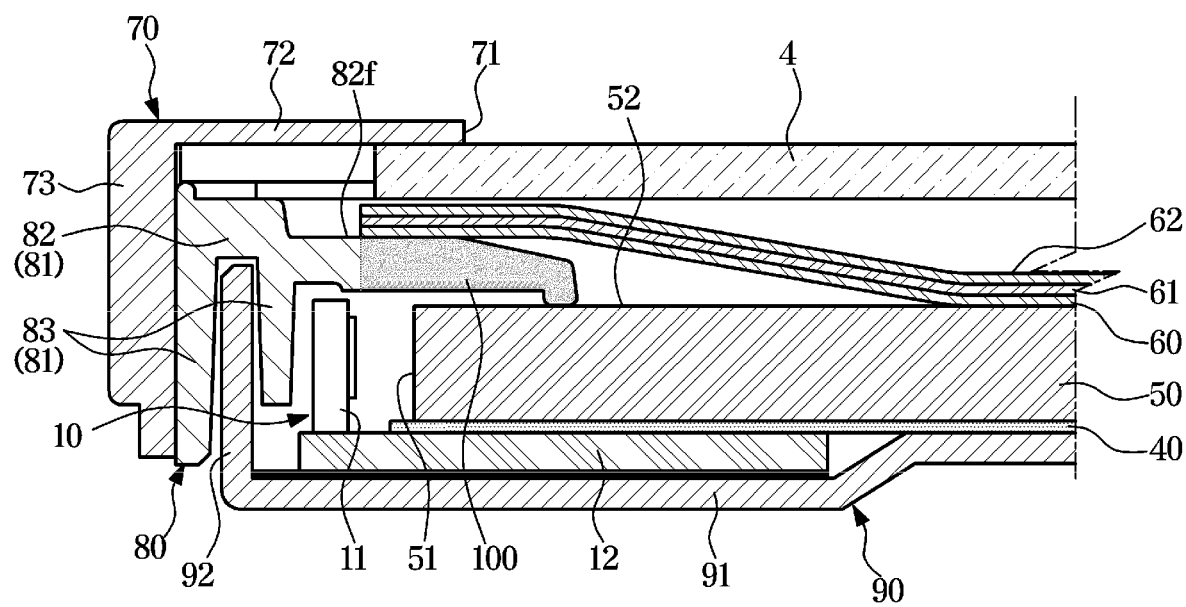
FIG. 3 is a cross-sectional view of the display apparatus according to an embodiment.
Figure 3:
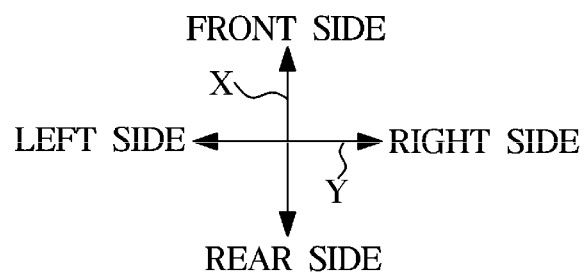
Figure 4:
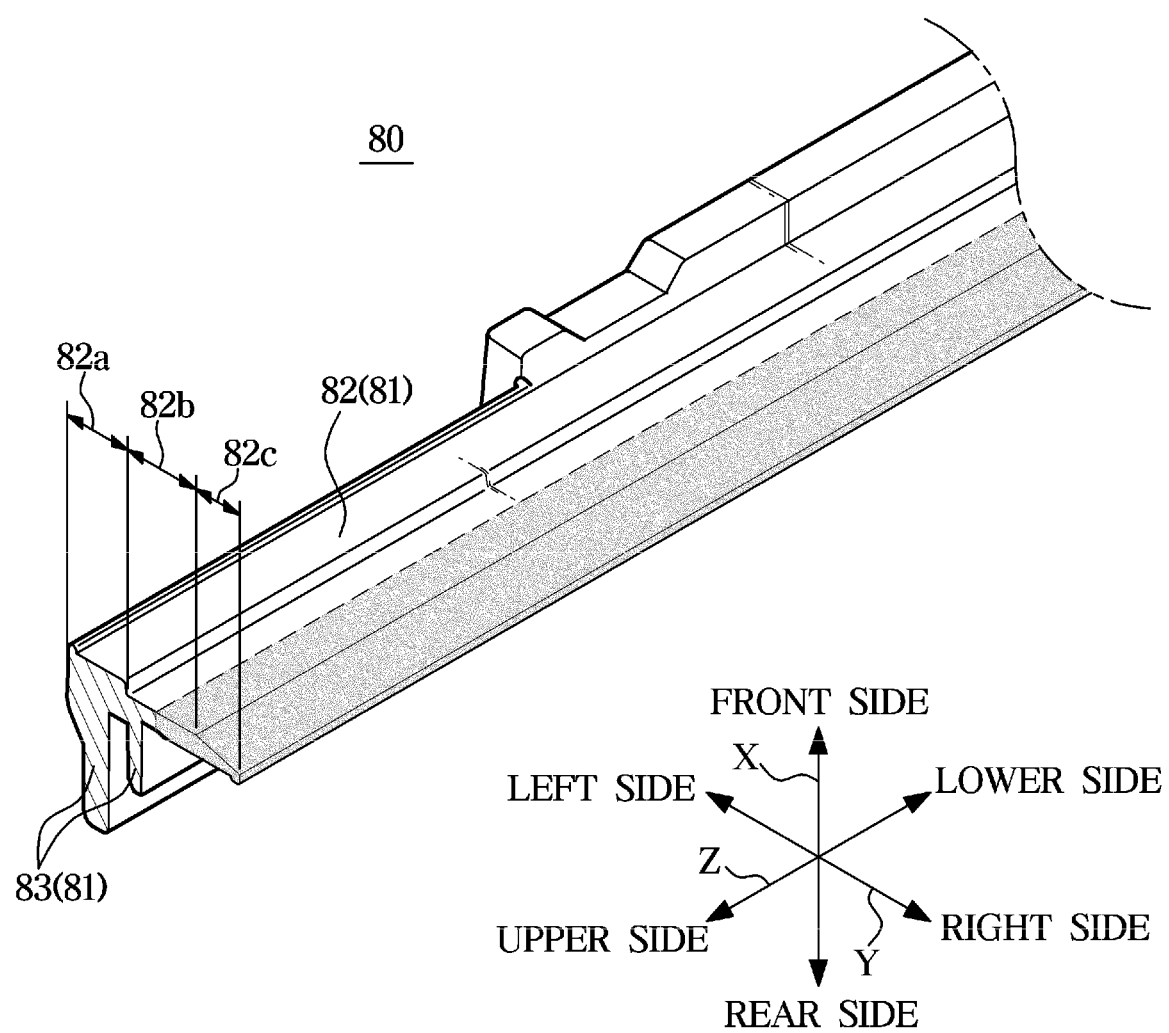
FIG. 4 is a view of a middle mold of the display apparatus according to an embodiment.
Figure 5:
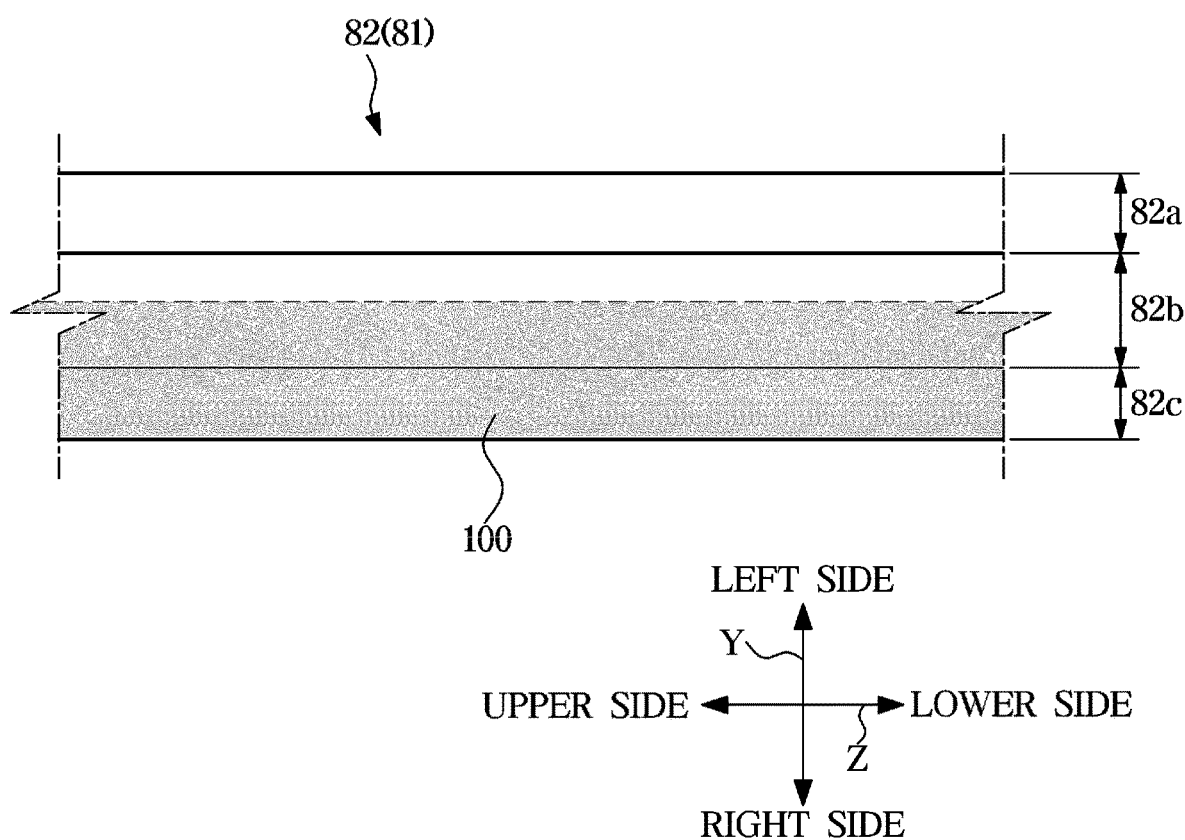
FIG. 5 is a view of a middle mold according to an embodiment.
Figure 6A:
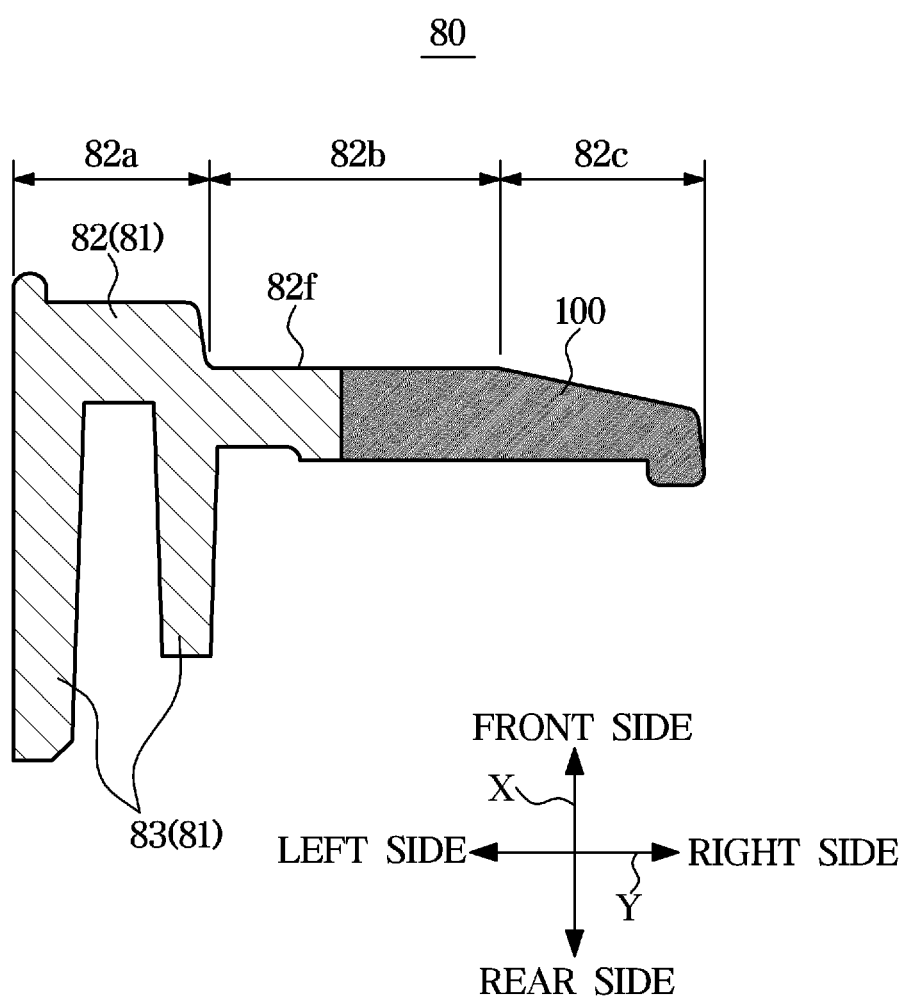
FIGS. 6A and 6B are views of middle molds, which are manufactured by a different method, according to an embodiment.

The display apparatus 1 may further include a leg 2 to support the display apparatus 1 from an installation surface. The display apparatus 1 may be supported on the bottom surface as illustrated in FIG. 1. Alternatively, unlike FIG. 1, the display apparatus 1 may be provided to be hung on a wall or may be provided inside a wall by a built-in method FIG. 3 is a cross-sectional view of the display apparatus according to an embodiment and FIG. 4 is a view of a middle mold of the display apparatus according to an embodiment. FIG. 5 is a view of a middle mold according to an embodiment. For reference, FIGS. 3 to 5 will be described with a case in which a color compensator 100 illustrated in FIG. 6A is applied. Hereinafter a display panel counter surface 82$f$ may be used as a concept including a front surface of the middle mold 80, particularly, a front surface of the middle mold body 82 and a front surface of the color compensator 100.

As illustrated in FIGS. 3 to 5, the middle mold 80 may include the middle mold frame 81 and the color compensator 100 provided on the middle mold frame 81. In other words, the middle mold 80 may be composed of the middle mold frame 81 and the color compensator 100 provided on the middle mold frame 81. The color compensator 100 may be provided on the middle mold frame 81 to allow uniform white light to be output to the outside of the display panel 4.

The middle mold frame 81 may include the middle mold body 82 and a middle mold leg 83 extending rearward from the middle mold body 82. The middle mold body 82 may extend in the width direction (Y) of the display apparatus 1. The middle mold body 82 may be positioned between the display panel 4 and the light source 11 to cover the light source 11.

The optical sheet 60, 61 and 62 may be supported on the middle mold body 82. Particularly, the middle mold body 82 may include the display panel counter surface 82$f$ directed to the display panel 4, and the optical sheet 60, 61 and 62 may be arranged on the display panel counter surface 82$f$ of the middle mold body 82. At this time, the quantum dot sheet 60 may be seated on the display panel counter surface 82$f$. In other words, the optical sheet 60, 61 and 62 may be supported on the middle mold body 82 to allow the quantum dot sheet 60 to be in contact with the display panel counter surface 82$f$.

The color compensator 100 may be formed in the middle mold body 82. In other words, the color compensator 100 may be formed on at least a part of the middle mold body 82.

The light source 11 may emit blue light. The blue light emitted from the light source 11 is incident on the incident surface 51 of the light guide plate 50, and changed into white light while passing through the quantum dot sheet 60 in a yellow color via the exit surface 52. The white light passing through the quantum dot sheet 60 may be transmitted to the display panel 4.

When the transmittance of the light emitted from the light source 11 about the middle mold 80 is small, the blue light emitted from the light source 11 and the yellow of the quantum dot sheet 60 may be not mixed appropriately and thus the display panel 4 may look yellow. That is, when the light emitted from the light source 11 is not sufficiently provided to the quantum dot sheet 60 because the light emitted from the light source 11 fails to pass through the middle mold 80, it may be difficult to generate white light because the blue color of the light emitted from the light source 11 is not appropriately mixed with the yellow color of the quantum dot sheet 60.

In addition, when external light or secondary light fails to reach the light source 11 behind the middle mold 80 because the external light or the secondary light fails to pass through the middle mold 80, or the external light or the secondary light is reflected by the display panel counter surface 82$f$ of the middle mold 80, it is difficult to generate white light.

As mentioned above, when it is difficult to generate the white light, color deviation may occur on the display panel 4. Particularly, color deviation may occur between an edge portion of the display panel 4 corresponding to the light source 11, and the remaining portion of the display panel 4.

Color deviation and flashlighting of the display panel 4 may be prevented by using the color compensator 100. The color compensator 100 may be provided on at least a part of the middle mold body 82 positioned between the light source 11 and the quantum dot sheet 60 to allow uniform white light to be output to the outside of the display panel 4.

The color compensator 100 may have a higher light transmittance than that of the middle mold frame 81. Particularly, the color compensator 100 may have a higher light transmittance than that of the middle mold body 82. The color compensator 100 may allow the blue color of the light emitted from the light source 11 to be appropriately mixed with the yellow color of the quantum dot sheet 60, by increasing the transmittance of the light emitted from the light source 11 about the light middle mold 80. For example, when the middle mold frame 81 has an opaque material, the color compensator 100 may have a semitransparent material.

The color compensator 100 may have the same color as the color of the light emitted from the light source 11. Particularly, the color compensator 100 may have a blue color. Although the external light or the secondary light fails to pass through the middle mold 80 or the external light or the secondary light is reflected by the display panel counter surface 82$f$ of the middle mold 80, it may be possible to generate the white light because the blue color of the light emitted from the light source 11 is appropriately mixed with the yellow color of the quantum dot sheet 60.

The color compensator 100 may be positioned on the middle mold frame 81 to face the quantum dot sheet 60. Particularly, the color compensator 100 may be positioned on the middle mold body 82 to face the quantum dot sheet 60.

The color compensator 100 may be provided on the middle mold frame 81 to be in contact with the quantum dots sheet 60. Particularly, the color compensator 100 may be provided on the middle mold body 82 to be in contact with the quantum dots sheet 60. At least a part of the color compensator 100 may be in contact with the quantum dot sheet 60.

The middle mold body 82 may include a plurality of areas. Particularly, the middle mold body 82 may include a first area 82$a$ directed to the outside of the display panel 4, a third area 82$c$ directed to the inside of the display panel 4, and a second area 82$b$ positioned between the first area 82$a$ and the third area 82$c$. The first area 82$a$ and the second area 82$b$ may be formed to be stepped in the front-rear direction (X) of the display apparatus 1. The first area 82$a$ may protrude more than the second area 82$b$ toward the display panel 4. That is, the second area 82$b$ may extend to the inside of the display panel 4 from the first area 82$a$ to less protrude than the first area 82$a$ toward the display panel 4. In other respects, the first area 82$a$ and the second area 82$b$ may have different thicknesses in the front-rear direction (X) of the display apparatus 1. That is, the first area 82a may have a greater thickness in the front-rear direction (X) of the display apparatus 1 than the second area 82b. The third area 82c may extend obliquely to the inside of the display panel 4 from the second area 82b. Particularly, the third area 82c may extend from the second area 82b to be inclined rearward of the display apparatus 1. A front surface of the first area 82a facing the display panel 4 and a front surface of the second area 82b may be flat. The display panel counter surface 82f of the middle mold body 82 may include the front surface of the first area 82a, the front surface of the second area 82b, and a front surface of the third area 82c.

The color compensator 100 may be provided on at least a part of the second area 82b of the middle mold body 82. That is, the color compensator 100 may be provided on at least a part of the second area 82b of the middle mold body 82 in contact with the quantum dot sheet 60.

The color compensator 100 may be provided across at least a part of the second area 82b, and the third area 82c. That is, the color compensator 100 may be provided across at least a part of the second area 82b of the middle mold body 82 facing the quantum dot sheet 60, and the third area 82c.

Figure 6B:
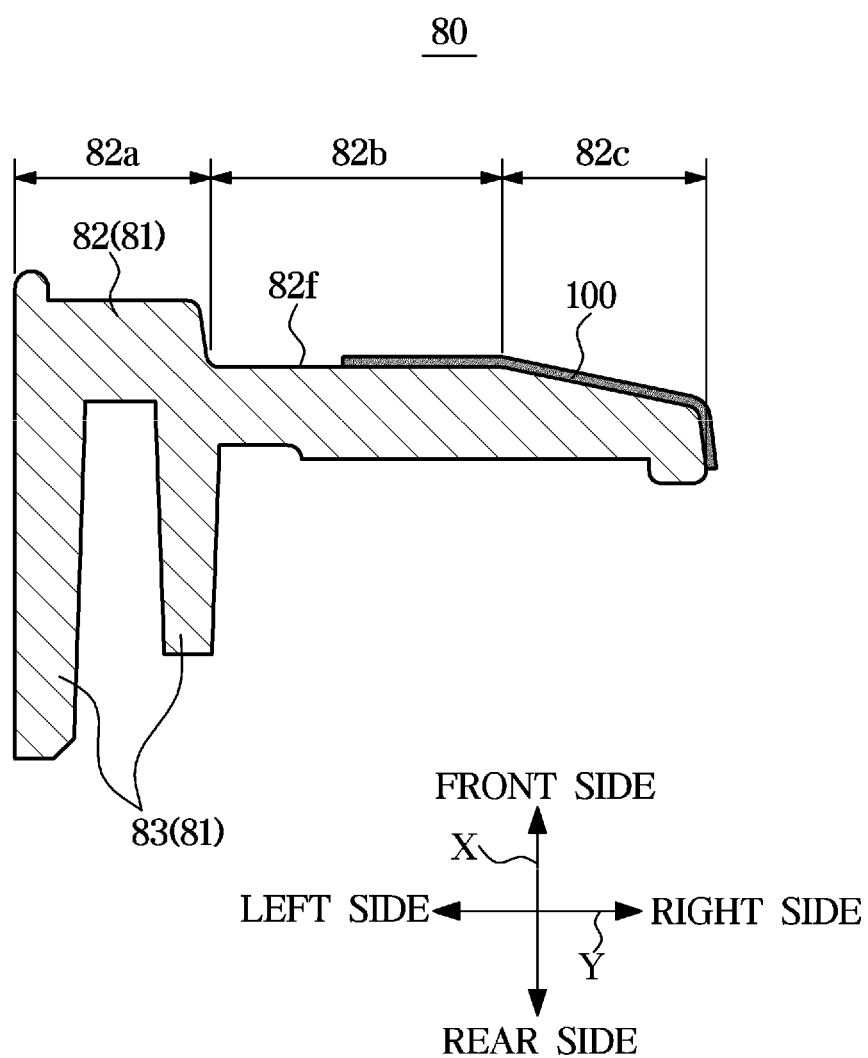

FIGS. 6A and 6B are views of the middle molds, which are manufactured by a different method, according to an embodiment.

As illustrated in FIG. 6A, the color compensator 100 may be formed through double injection molding. That is, the color compensator 100 may be formed integrally with the middle mold 80 through the double injection molding.

The middle mold frame 81 may be formed of resin. The resin may include any one or any combination of Polycarbonate (PC) resin, Acrylonitrile Butadiene Styrene (ABS) resin and Polybutylene Terephthalate (PBT) resin. The middle mold frame 81 may be formed of a material in which resin and glass fiber are mixed with each other. Further, the middle mold frame 81 may be formed of a material in which resin, glass fiber and white coloring agents are mixed with each other.

The color compensator 100 may have the light transmittance higher than that of the middle mold frame 81. The color compensator 100 may be formed of resin. The kind of the resin may be the same as that of the resin used for forming the middle mold frame 81. The color compensator 100 may be formed of a material in which resin and glass fiber are mixed. Further, the color compensator 100 may be formed of a material in which resin, glass fiber and white coloring agents are mixed. A content of the white coloring agents of the color compensator 100 may be less than a content of the white coloring agents of the middle mold frame 81. Accordingly, the color compensator 100 may have the light transmittance higher than that of the middle mold frame 81 by reducing the content of the white coloring agents of the color compensator 100. The middle mold frame 81 may be formed of an opaque material, and the color compensator 100 is formed of a semitransparent material. However, because it is enough to have a transmittance difference between the middle mold frame 81 and the color compensator 100, it does not have to form the middle mold frame 81 with the opaque material or it does not have to form the middle mold frame 81 with the semitransparent material.

Further, the middle mold frame 81 and the color compensator 100 may be formed of different materials so as to have a difference in the transmittance.

The color compensator 100 may have a blue color. In this case, the middle mold frame 81 and the color compensator 100 may be formed of the same material only with different colors. The material of the middle mold frame 81 is the same as that described above and thus it will be omitted. The color compensator 100 may be formed of a material in which resin and blue coloring agents are mixed. The resin may include any one or any combination of Polycarbonate (PC) resin, Acrylonitrile Butadiene Styrene (ABS) resin and Polybutylene Terephthalate (PBT) resin. The color compensator 100 may be formed of a material in which resin and glass fiber are mixed. Further, the color compensator 100 may be formed of a material in which resin, glass fiber and blue coloring agents are mixed with each other.

As illustrated in FIG. 6B, the color compensator 100 may be formed on at least a part of the display panel counter surface 82f of the middle mold 80. Particularly, the color compensator 100 may be formed on at least a part of the display panel counter surface 82f of the middle mold 80 by using any one or any combination of coating, printing and adhesion. The description of the material of the color compensator 100 is the same as that described in FIG. 6A and thus it will be omitted.

Figure 7:
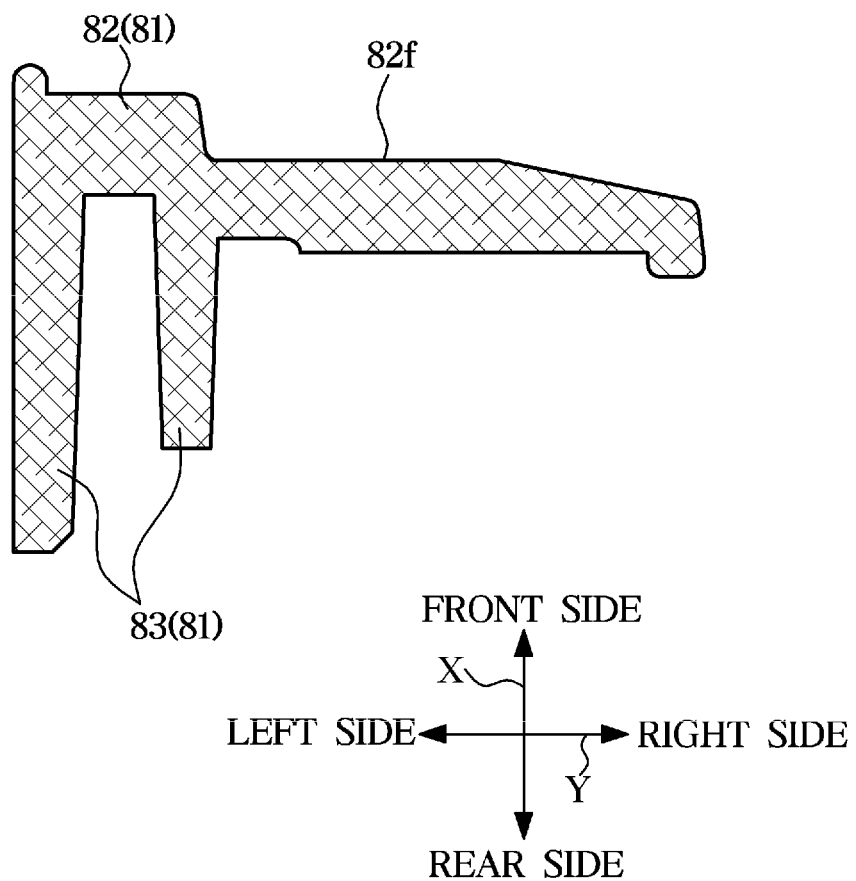
FIG. 7 is a view of a middle mold according to an embodiment.

FIG. 7 is a view of a middle mold according to an embodiment. A description the same as the description above of the middle mold 80 will be omitted. Hereinafter the display panel counter surface 82f may be used as a concept including a front surface of a middle mold 80a, particularly, a front surface of a middle mold body 82.

As illustrated in FIG. 7, the middle mold 80a may also serve as the color compensator 100. In other words, the middle mold 80a itself may function as the color compensator 100. Particularly, the middle mold 80a may have the same color as the color of the light emitted from the light source 11. More particularly, the middle mold 80a may have a blue color. Further, the entirety of the middle mold 80a may have a blue color. Although the external light or the secondary light fails to pass through the middle mold 80a, or the external light or the secondary light is reflected by the display panel counter surface 82f of the middle mold 80a, it may be possible to generate the white light because the blue color of the middle mold 80a is appropriately mixed with the yellow color of the quantum dot sheet 60.

The middle mold 80a may be formed of a material in which resin and blue coloring agents are mixed with each other. The resin may include any one or any combination of PC resin, ABS resin, and PBT resin. The middle mold 80a may be formed of a material in which resin and glass fiber are mixed. Further, the middle mold 80a may be formed of a material in which resin, glass fiber and blue coloring agents are mixed with each other.

The middle mold 80a in the blue color may be formed through injection molding. Further, the middle mold 80a in the blue color may be formed by implementing a blue color through any one or any combination of coating, printing, double injection molding and adhesion on the surface of the middle mold 80a.

Figure 8:
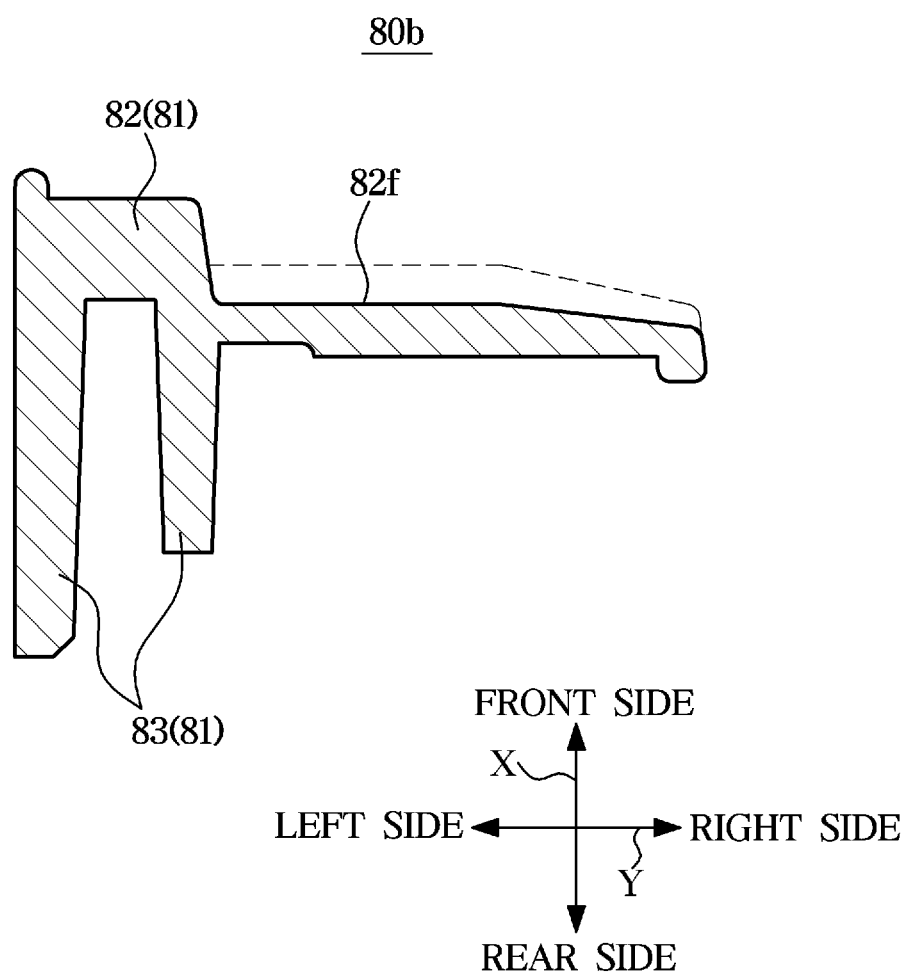
FIG. 8 is a view of a middle mold according to an embodiment.

FIG. 8 is a view of a middle mold according to an embodiment. A description the same as the description above of the middle mold 80 will be omitted. For reference, a dotted line in FIG. 8 represents a middle mold having a relatively large thickness.

As illustrated in FIG. 8, a middle mold 80b may have a small thickness to allow uniform white light to be output to the outside of the display panel 4. Particularly, at least a part of the middle mold body 82 facing the quantum dot sheet 60 may have a small thickness. In other words, at least a part of the middle mold body 82 in contact with the quantum dot sheet 60 may have a small thickness. The second area 82b and the third area 82c of the middle mold body 82 may have a small thickness in the front-rear direction (X) of the display apparatus 1.

When the thickness of the middle mold 80b is reduced, the light emitted from the light source 11 may be transmitted through the middle mold 80b, and output to the outside of the display panel 4 via the quantum dot sheet 60. Accordingly, the light emitted from the light source 11 may pass through the middle mold 80b and thus the blue color of the light emitted from the light source 11 may be appropriately mixed with the yellow color of the quantum dot sheet 60 so as to generate the white light.

Figure 9:
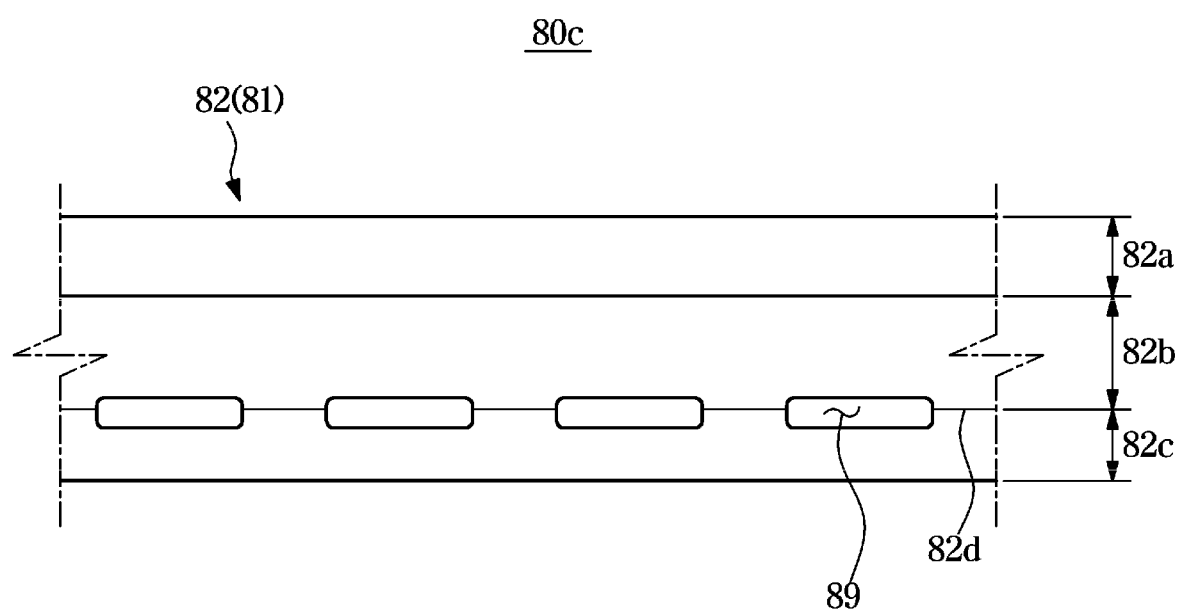
FIG. 9 is a view of a middle mold according to an embodiment.
Figure 9:
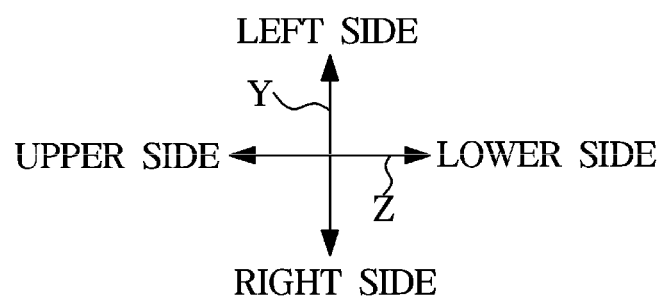

FIG. 9 is a view of a middle mold according to an embodiment. A description the same as the description above of the middle mold 80 will be omitted As illustrated in FIG. 9, a middle mold 80c may include at least one hole 89 to allow uniform white light to be output to the outside of the display panel 4. Particularly, the at least one hole 89 may be formed in the middle mold body 82. The at least one hole 89 may be formed on at least a part of the middle mold body 82 facing the quantum dot sheet 60. In other words, the at least one hole 89 may be formed on at least a part of the middle mold body 82 in contact with the quantum dot sheet 60. The at least one hole 89 may be formed on a boundary 82d between the second area 82b and the third area 82c.

When the at least one hole 89 is formed in the middle mold 82c, the light emitted from the light source 11 may pass through the at least one hole 89, and output to the outside of the display panel 4 via the quantum dot sheet 60. Accordingly, the light emitted from the light source 11 may pass through the middle mold 80c via the at least one hole 89 and thus the blue color of the light emitted from the light source 11 may be appropriately mixed with the yellow color of the quantum dot sheet 60 so as to generate the white light.

Figure 10:
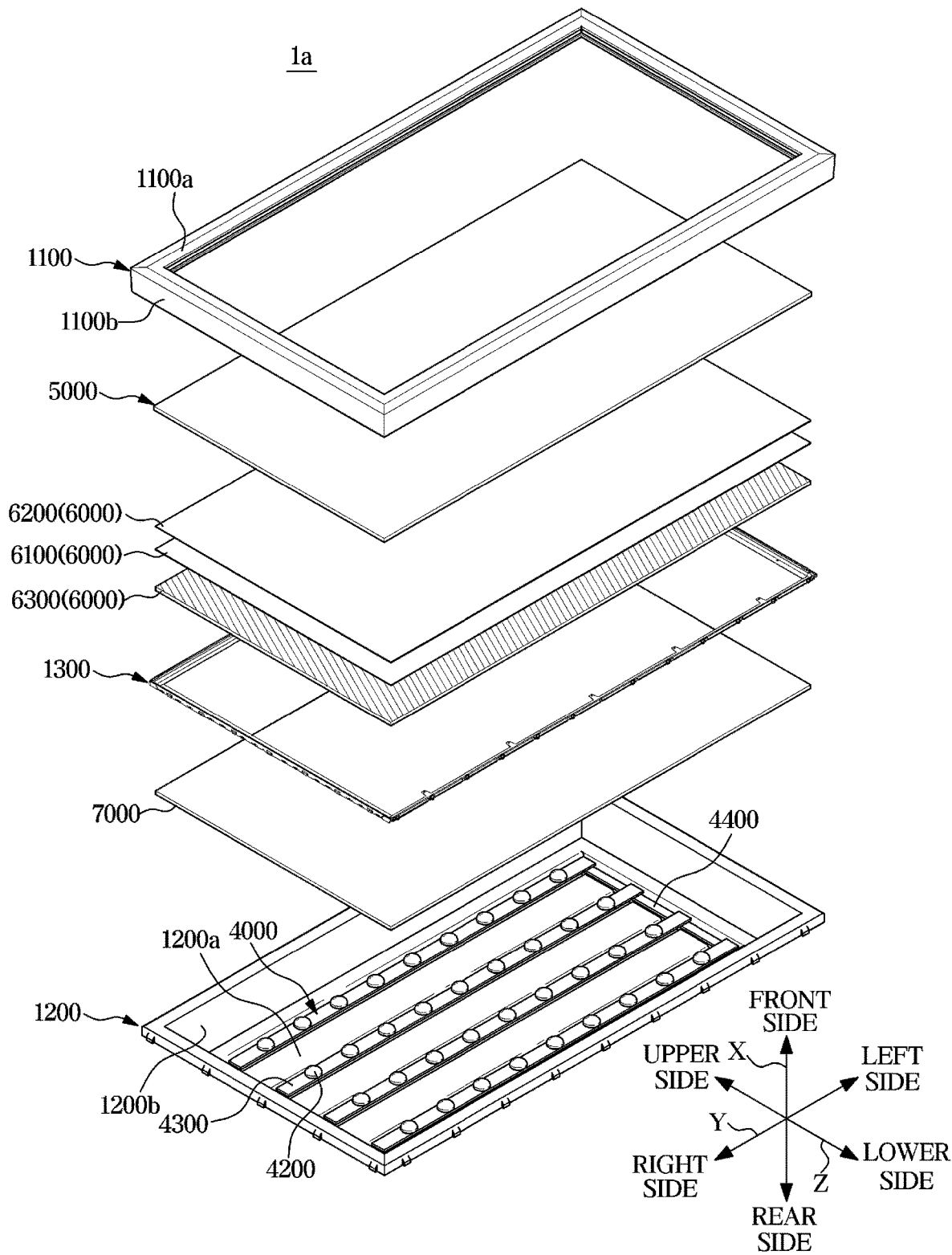
FIG. 10 is an exploded perspective view of a display apparatus according to an embodiment.
Figure 11:
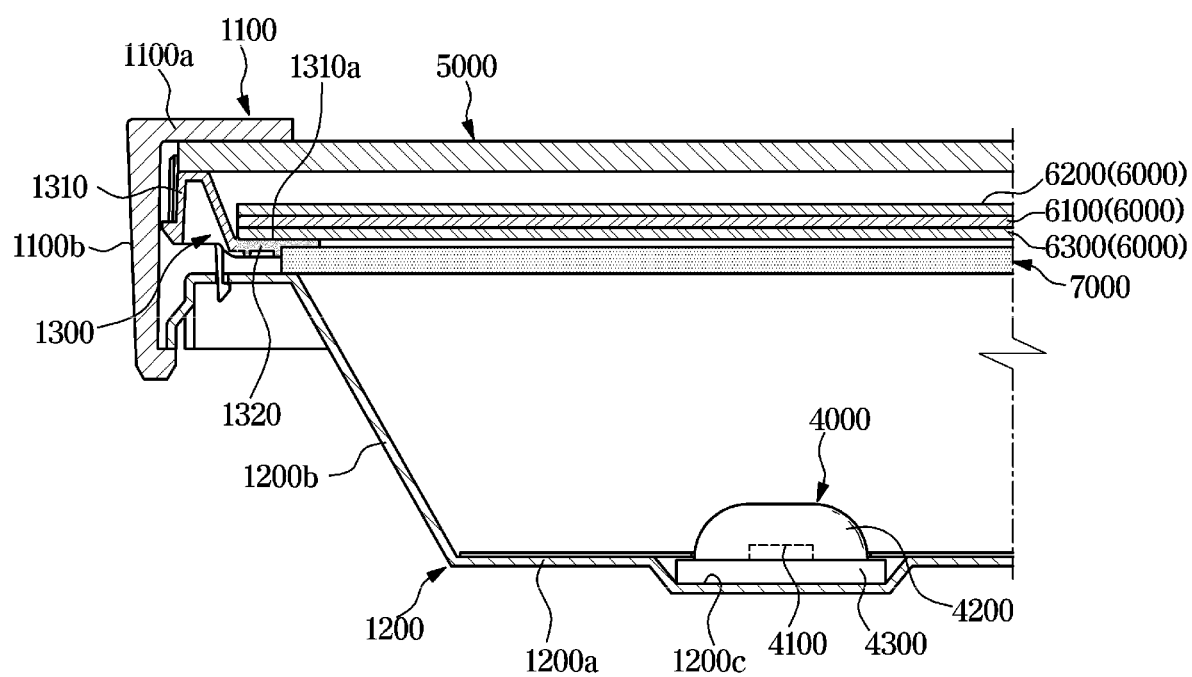
FIG. 11 is a cross-sectional view of the display apparatus according to an embodiment.
Figure 11:
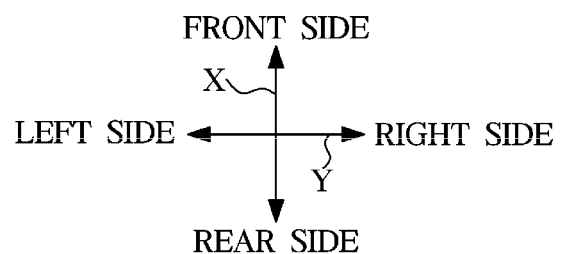
Figure 12:
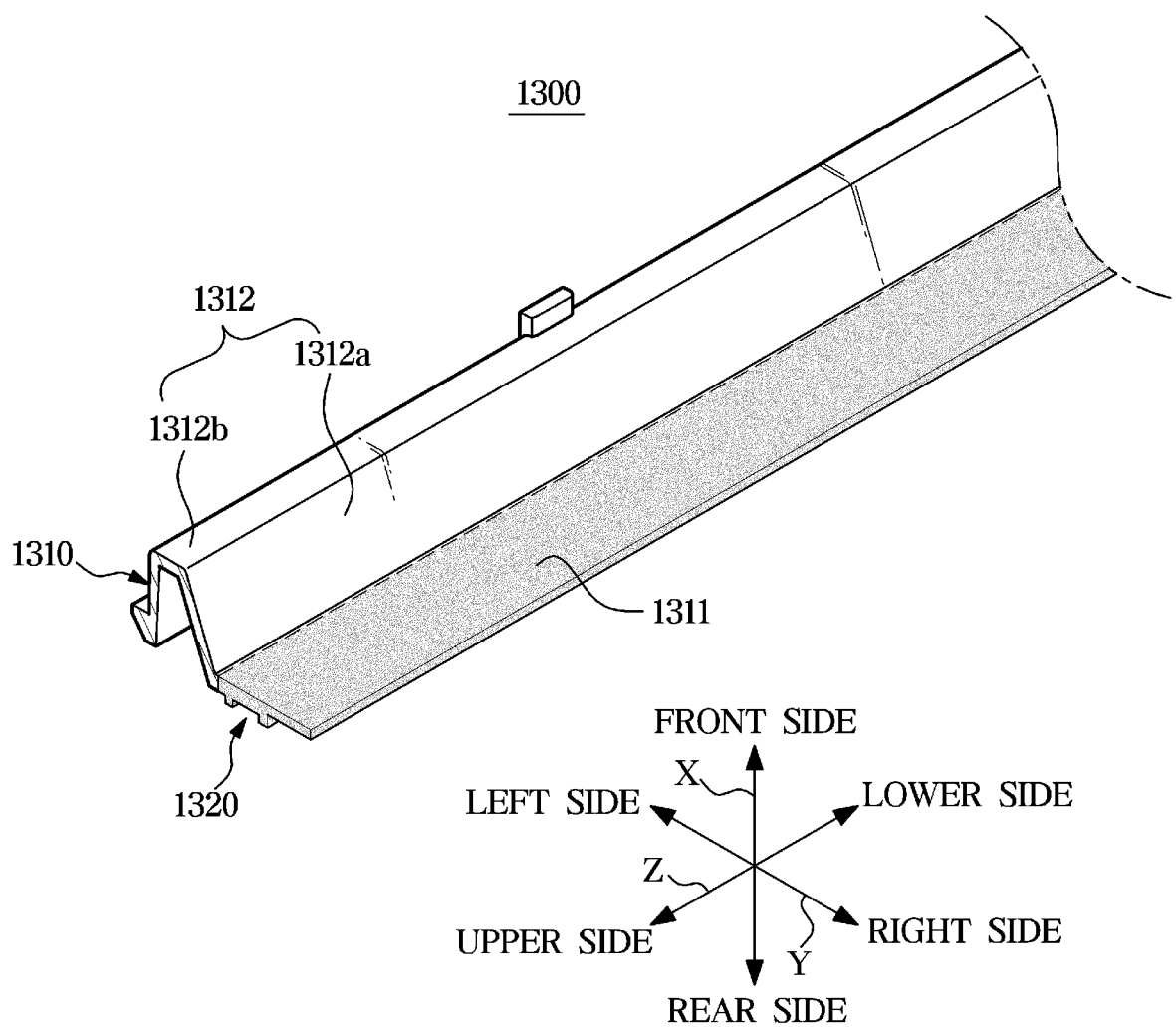
FIG. 12 is a view of a middle mold of the display apparatus according to an embodiment.

FIG. 10 is an exploded perspective view of a display apparatus according to an embodiment, and FIG. 11 is a cross-sectional view of the display apparatus according to an embodiment. FIG. 12 is a view of a middle mold of the display apparatus according to an embodiment. Below, a description is provided with respect to a display apparatus 1a that has a direct type backlight unit. Below, a display panel counter surface 1310a may be used as a concept including a front surface of a middle mold 1300; particularly, a front surface of a middle mold frame 1310 and a front surface of a color compensator 1320.

As illustrated in FIGS. 10 to 12, a display apparatus 1a may further include a chassis assembly configured to receive and support a display panel 5000 and a backlight unit 4000.

The chassis assembly may include a top chassis 1100, a middle mold 1300, and a bottom chassis 1200.

The top chassis 1100 is provided on the same surface as the display panel 5000, on which an image is displayed, to prevent an edge portion of the display panel 5000 from being exposed to the outside. The top chassis 1100 may include a bezel 1100a covering a front edge of the display panel 5000 and a top lateral side portion 1100b bent rearward from the edge of the bezel 1100a.

The bottom chassis 1200 may be positioned on the opposite side of the display panel 5000. In addition, the bottom chassis 1200 may prevent various components contained in the display apparatus 1a from being exposed to the outside, and protect various components contained in the display apparatus 1a from external impacts. The backlight unit 4000 may be installed in the bottom chassis 1200. The bottom chassis 1200 may include a bottom rear portion 1200a on which the backlight unit 4000 is seated and a bottom lateral side portion 1200b extending forward from an edge of the bottom rear portion 1200a. The bottom rear portion 1200a may be provided with a seating groove 1200c formed in a concave shape to allow a circuit board 4300 of the backlight unit 4000 to be seated thereon.

The middle mold 1300 may be configured to support the display panel 5000 and a light diffuser plate 7000. The middle mold 1300 may support the display panel 5000 in front of the middle mold 1300 and the light diffuser plate 7000 behind the middle mold 1300. The top chassis 1100 may be installed in front of the middle mold 1300 to maintain the display panel 5000 in a state of being installed in the middle mold 1300. The bottom chassis 1200 may be installed behind the middle mold 1300. A detailed description of the middle mold 1300 will be described below.

The display apparatus 1a may include the display panel 5000. A description of the display panel 5000 is the same as that of the display panel of FIGS. 1 and 2.

The display apparatus 1a may further include the backlight unit 4000 supplying light to the display panel 5000. The backlight unit 4000 may be positioned behind the display panel 5000 to be apart from the display panel 5000.

The backlight unit 4000 may include a plurality of light sources 4100 generating light. The plurality of light sources 4100 emit light. Further, the plurality of light sources 4100 may emit blue light. The plurality of light sources 4100 may be installed on the front surface of the circuit board 4300 to face the light diffuser plate 7000. In addition, the plurality of light sources 4100 may emit light toward the display panel 5000.

Further, the backlight unit 4000 may further include a plurality of lenses 4200 individually surrounding the plurality of light sources 4100. The plurality of lenses 4200 may be installed in the plurality of light sources 4100 to diffuse the light generated by the plurality of light sources 4100. The plurality of lenses 4200 may have a circular shape, but the shapes of the plurality of lenses 4200 may be variously modified. The plurality of lenses 4200 may be formed of a resin material having the light transmittance. For example, the plurality of lenses 4200 may be implemented by polycarbonate (PC), polymethyl methacrylate (PMMA), and acrylic. The material for implementing the plurality of lenses 4200 is not limited thereto, and may be implemented with various materials such as glass materials.

The backlight unit 4000 may further include the circuit board 4300 on which the plurality of light sources 4100 are mounted. The circuit board 4300 may include any one or both of a printed circuit board and a flexible copper clad laminate.

The circuit board 4300 may be positioned in the bottom chassis 1200. The circuit board 4300 may be elongated to have a length in one direction, corresponding to the display panel 5000. A conductive pattern may be formed on the circuit board 4300. The plurality of light sources 4100 and the circuit board 4300 may be electrically connected through a method such as wire bonding or flip chip bonding.

The backlight unit 4000 may include a plurality of circuit boards 4300 positioned in parallel with each other and spaced apart from each other. On each circuit board 4300, the plurality of light sources 4100, and the plurality of lenses 4200 installed in the plurality of light sources 4100, respectively, may be arranged to be apart from each other in the longitudinal direction of the plurality of circuit boards 4300. The plurality of circuit boards 4300 may be connected to each other via a connection board 4400.

The display apparatus 1a may further include a light diffuser plate 7000 configured to allow light emitted from the backlight unit 4000 to be diffused and transmitted to the display panel 5000. In other words, the light diffuser plate 7000 may be positioned between the display panel 5000 and the plurality of light sources 4100 to diffuse the light emitted from the plurality of light sources 4100 and guide the light to the display panel 5000. The light diffuser plate 7000 may be positioned behind the display panel 5000.

The display apparatus 1a may further include an optical sheet 6000 positioned on a front surface of the light diffuser plate 7000 to improve the properties of the light emitted from the plurality of light sources 4100. Particularly, the optical sheet 6000 may be supported on the middle mold 1300. More particularly, the optical sheet 6000 may be supported on the display panel counter surface 1310a of the middle mold 1300. The optical sheet 6000 may be positioned in the upper side of the plurality of light sources 4100. The optical sheet 6000 may further include a quantum dot sheet 6300 outputting white light (i.e., light in which various colors of the light are mixed) by receiving light emitted from the plurality of light sources 4100. The optical sheet 6000 may further include a prism film 6100 focusing the light, which is diffused by the light diffuser plate 7000, to a direction perpendicular to the display panel 5000. The optical sheet 6000 may further include a protective film 6200 protecting the prism film 6100. The protective film 6200 may be positioned on a front surface of the prism film 6100. The protective film 6200 may protect various components contained in the backlight unit 4000 from external impacts or foreign substance. Particularly, the protective film 6200 may be positioned on the front surface of the prism film 6100 to prevent scratches because the prism film 6100 is vulnerable to scratches. The optical sheet 6000 may further include a double brightness enhance film. The double brightness enhance film may be positioned on a front surface of the protective film 6200. The double brightness enhance film is a type of polarizing film and also referred to as a reflective polarizing film. Among light waves emitted from the backlight unit 4000, the double brightness enhance film may transmit polarized light waves in a direction parallel to the polarization direction of the double brightness enhance film, and reflect polarized light waves in a direction different from the polarization direction of the double brightness enhance film. The reflected light may be recycled in the backlight unit 4000 and thus the brightness of the display apparatus 1a may be increased.

The middle mold 1300 may include the middle mold frame 1310 and the color compensator 1320 positioned in the middle mold frame 1310. The middle mold 1300 may be composed of the middle mold frame 1310 and the color compensator 1320 positioned in the middle mold frame 1310. The color compensator 1320 may be provided on the middle mold frame 1310 to allow uniform white light to be output to the outside of the display panel 5000.

The optical sheet 6000 may be supported on the middle mold frame 1310. Particularly, the middle mold frame 1310 may include the display panel counter surface 1310a directed to the display panel 5000, and the optical sheet 6000 may be arranged on the display panel counter surface 1310a of the middle mold frame 1310. At this time, the quantum dot sheet 6300 may be seated on the display panel counter surface 1310a. In other words, the optical sheet 6000 may be supported on the middle mold frame 1310 to allow the quantum dot sheet 6300 to be in contact with the display panel counter surface 1310a.

The color compensator 1320 may be provided in the middle mold frame 1310 to face the quantum dot sheet 6300.

The color compensator 1320 may be provided in the middle mold frame 1310 to be in contact with the quantum dot sheet 6300.

The middle mold frame 1310 may include an optical sheet seating portion 1311 on which the quantum dot sheet 6300 is seated, and a display panel seating portion 1312 extending from the optical sheet seating portion 1311 toward the display panel 5000 to allow the display panel 5000 to be seated thereon. The optical sheet seating portion 1311 and the display panel seating portion 1312 may be formed to be stepped in the front-rear direction (X) of the display apparatus 1a. In other words, the display panel seating portion 1312 may protrude more than the optical sheet seating portion 1311 toward the display panel 5000 in the front-rear direction (X) of the display apparatus 1a. The optical sheet seating portion 1311 may be positioned toward the inside of the display panel 5000 and the display panel seating portion 1312 may be positioned toward the outside of the display panel 5000. The optical sheet seating portion 1311 may have a flat shape. The display panel seating portion 1312 may include a connection portion 1312a connected to the optical sheet seating portion 1311, and a supporter 1312b on which the display panel 5000 is positioned and supported. The supporter 1312b may have a flat shape.

The color compensator 1320 may be provided on at least a part of the optical sheet seating portion 1311. That is, the color compensator 1320 may be provided on the at least a part of the optical sheet seating portion 1311 in contact with the quantum dot sheet 6300.

Figure 13:
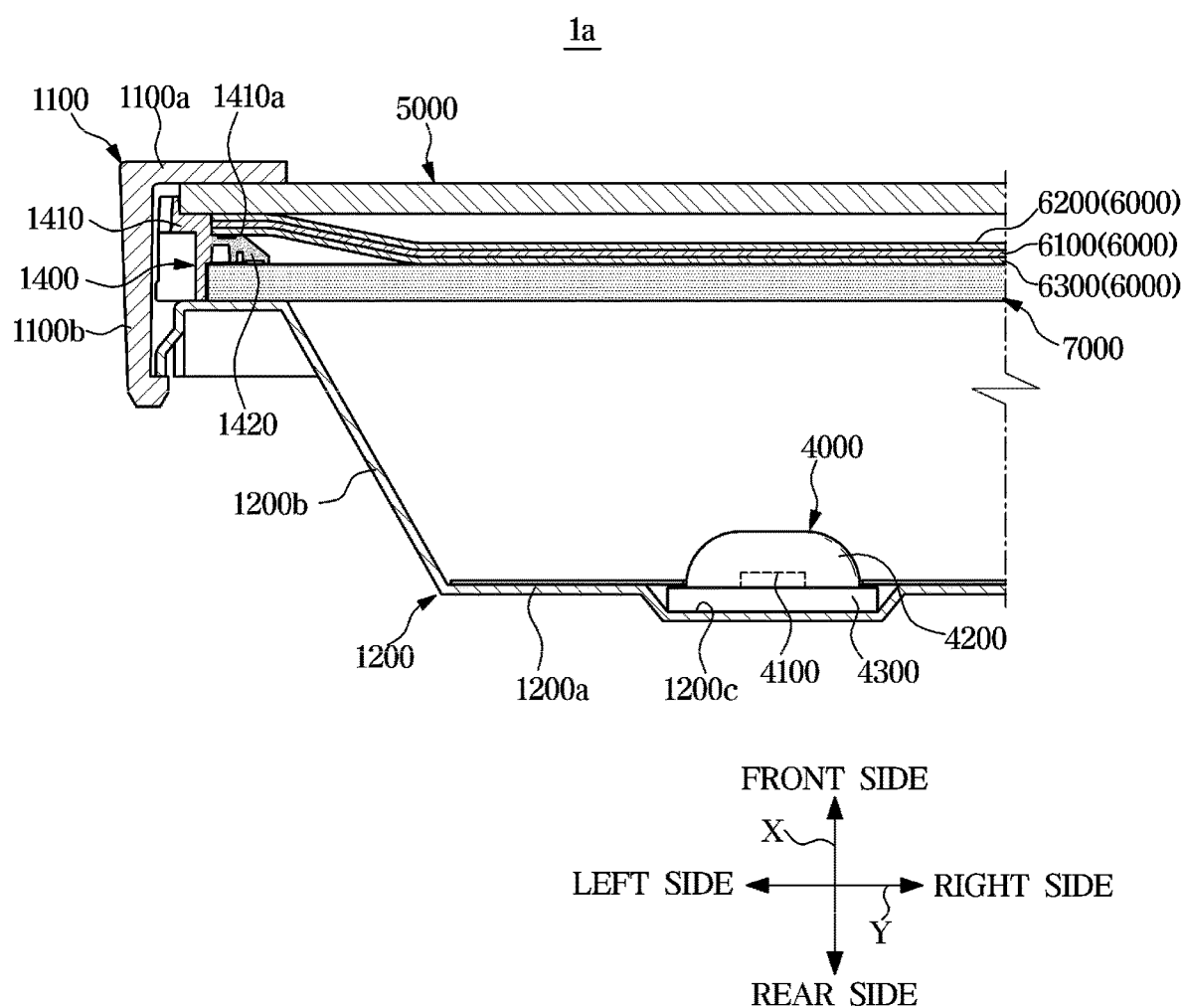
FIG. 13 is a cross-sectional view of a display apparatus according to an embodiment.
Figure 14:
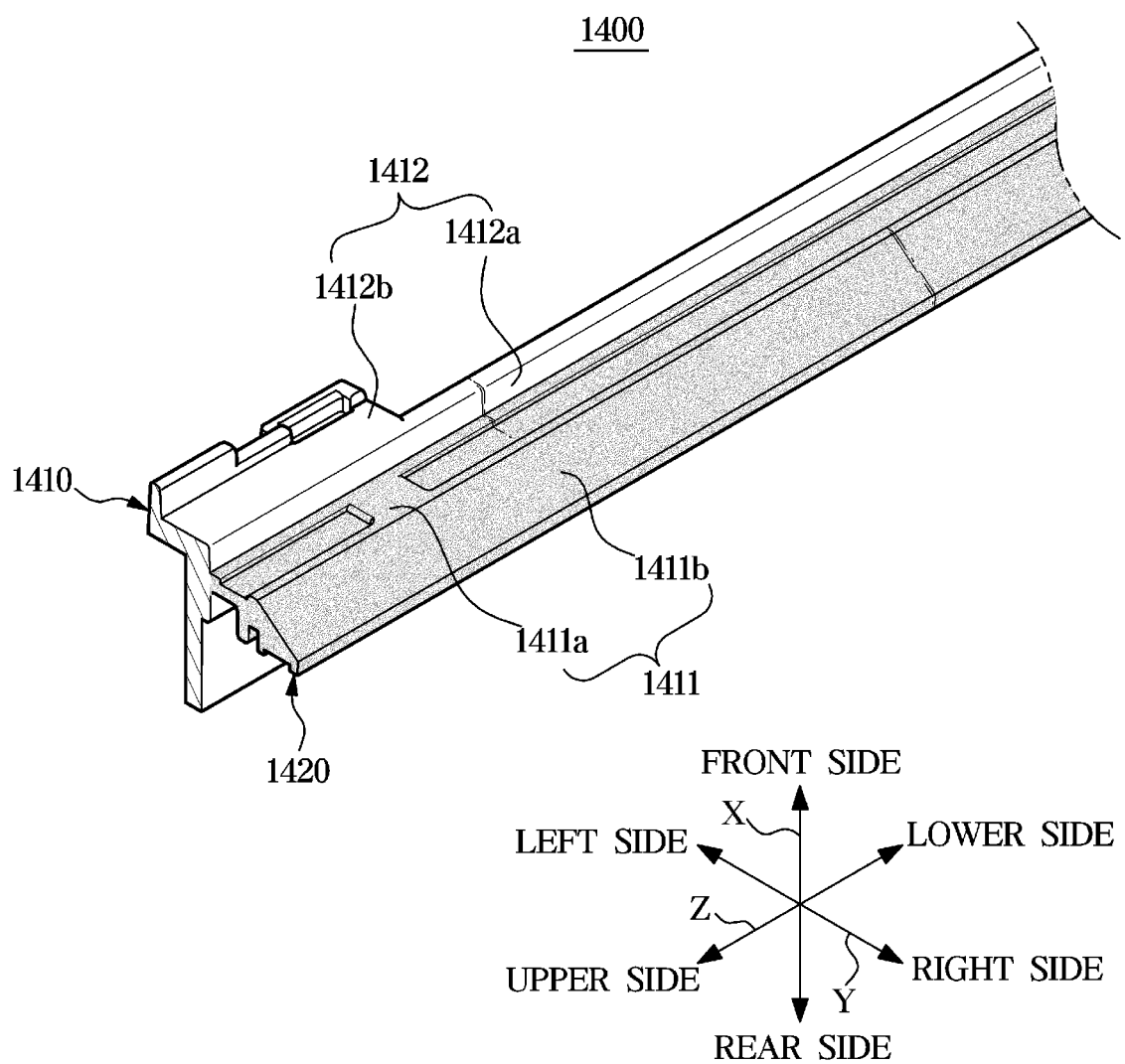
FIG. 14 is a view of a middle mold of the display apparatus according to an embodiment.

FIG. 13 is a cross-sectional view of a display apparatus according to an embodiment and FIG. 14 is a view of a middle mold of the display apparatus according to an embodiment. FIGS. 13 and 14 will be described with respect to a display apparatus 1a provided with a direct type backlight unit. A description the same as the description of FIGS. 10 to 12 will be omitted. Below, a display panel counter surface 1410a may be used as a concept including a front surface of a middle mold 1400, particularly, a front surface of a middle mold body 1410 and a front surface of a color compensator 1420.

As illustrated in FIGS. 13 and 14, the middle mold 1400 may include the middle mold body 1410 and the color compensator 1420 positioned in the middle mold body 1410. In other words, the middle mold 1400 may be composed of the middle mold body 1410 and the color compensator 1420 positioned in the middle mold body 1410. The color compensator 1420 may be provided on the middle mold frame 1410 to allow uniform white light to be output to the outside of a display panel 5000.

An optical sheet 6000 may be supported on the middle mold frame 1410. Particularly, the middle mold frame 1410 may include the display panel counter surface 1410a directed to the display panel 5000, and the optical sheet 6000 may be arranged on the display panel counter surface 1410a of the middle mold frame 1410. At this time, a quantum dot sheet 6300 may be seated on the display panel counter surface 1410a. In other words, the optical sheet 6000 may be supported on the middle mold frame 1410 to allow the quantum dot sheet 6300 to be in contact with the display panel counter surface 1410a.

The color compensator 1420 may be provided in the middle mold frame 1410 to face the quantum dot sheet 6300.

The color compensator 1420 may be provided in the middle mold frame 1410 to be in contact with the quantum dot sheet 6300.

The middle mold frame 1410 may include an optical sheet seating portion 1411 on which the quantum dot sheet 6300 is seated, and a display panel seating portion 1412 extending from the optical sheet seating portion 1411 toward the display panel 5000 to allow the display panel 5000 to be seated thereon. The optical sheet seating portion 1411 and the display panel seating portion 1412 may be formed to be stepped in the front-rear direction (X) of the display apparatus 1*a*. In other words, the display panel seating portion 1412 may protrude more than the optical sheet seating portion 1411 toward the display panel 5000 in the front-rear direction (X) of the display apparatus 1*a*. The optical sheet seating portion 1411 may be positioned toward the inside of the display panel 5000 and the display panel seating portion 1412 may be positioned toward the outside of the display panel 5000. The optical sheet seating portion 1411 may include an optical sheet supporter 1411*a* on which the quantum dot sheet 6300 is positioned and supported, and a bent portion 1411*b* bent from the optical sheet supporter 1411*a* and extended toward a light diffuser plate 7000. The display panel seating portion 1412 may include a connection portion 1412*a* connected to the optical sheet seating portion 1411, and a display panel supporter 1412*b* on which the display panel 5000 is positioned and supported. The display panel supporter 1412*b* may have a flat shape.

The color compensator 1420 may be provided on at least a part of the optical sheet seating portion 1411. That is, the color compensator 1420 may be provided on the at least a part of the optical sheet seating portion 1411 in contact with the quantum dot sheet 6300. For example, the color compensator 1420 may be provided on at least a part of the optical sheet supporter 1411*a* in contact with the quantum dot sheet 6300. Alternatively, the color compensator 1420 may be provided across the at least a part of the optical sheet supporter 1411*a* and the bent portion 1411*b*.

As is apparent from the above description, it is possible to output uniform white light to the outside of a display panel by providing a color compensator to a middle mold. In addition, it is possible to output uniform white light to the outside of a display panel by adjusting a thickness of a middle mold. Further, it is possible to output uniform white light to the outside of a display panel by forming at least one hole on a middle mold. Accordingly, it is possible to effectively prevent flashlighting and color deviation by changing the structure of the middle mold.

Although embodiments have been shown and described, it would be appreciated by those skilled in the art that changes may be made in these embodiments without departing from the principles and spirit of the disclosure, the scope of which is defined in the claims and their equivalents.

What is claimed is:

1. A display apparatus comprising:
   a display panel configured to display an image;
   a light source configured to supply light to the display panel;
   a middle mold positioned between the display panel and the light source; and
   a quantum dot sheet positioned between the display panel and the middle mold, the quantum dot sheet configured to convert a wavelength of light emitted from the light source,
   wherein the middle mold comprises a color compensator having a blue color that is configured to provide uniform white light to outside of the display panel, and
   wherein the quantum dot sheet is positioned on an upper surface of the color compensator, the upper surface facing the display panel.

2. The display apparatus of claim 1, wherein the middle mold further comprises a middle mold frame, and wherein the color compensator is positioned on the middle mold frame and is in contact with the quantum dot sheet.

3. The display apparatus of claim 1, wherein the middle mold further comprises a middle mold body positioned between the display panel and the light source to cover the light source, the middle mold body extending in a width direction of the display panel, and
   wherein the color compensator is positioned in the middle mold body.

4. The display apparatus of claim 3,
   wherein the middle mold body comprises:
   a first area;
   a second area extending from the first area to the inside of the display panel, and the second area is stepped with respect to the first area; and
   a third area obliquely extending to the inside of the display panel from the second area, and
   wherein the color compensator is provided in at least a part of the second area.

5. The display apparatus of claim 4, wherein the color compensator is provided across at least a part of the third area.

6. The display apparatus of claim 1, wherein the color compensator is formed by double injection molding.

7. The display apparatus of claim 1, wherein the middle mold further comprises a display panel counter surface facing the display panel, and the quantum dot sheet is positioned on the display panel counter surface, and
   wherein the color compensator is formed on at least a part of the display panel counter surface by using any one or any combination of coating, printing and adhesion.

8. The display apparatus of claim 1, wherein the color compensator is formed of a material in which resin and blue coloring agents are mixed with each other.

9. The display apparatus of claim 8, wherein the resin comprises any one or any combination of Polycarbonate (PC) resin, Acrylonitrile Butadiene Styrene (ABS) resin and Polybutylene Terephthalate (PBT) resin.

10. A display apparatus comprising:
    a display panel configured to display an image;
    a light source configured to supply light to the display panel;
    a middle mold positioned between the display panel and the light source, wherein the middle mold is configured to have a blue color to provide uniform white light to outside of the display panel; and
    a quantum dot sheet configured to convert a wavelength of light emitted from the light source.

11. The display apparatus of claim 10, wherein the middle mold is formed of a material in which resin and blue coloring agents are mixed with each other.

12. The display apparatus of claim 11, wherein the resin comprises any one or any combination of Polycarbonate (PC) resin, Acrylonitrile Butadiene Styrene (ABS) resin and Polybutylene Terephthalate (PBT) resin.

13. The display apparatus of claim 10, wherein an entirety of the middle mold has the blue color.

14. The display apparatus of claim 10, wherein the quantum dot sheet is positioned on the middle mold.

15. A display apparatus comprising:
    a display panel configured to display an image;
    a light source configured to supply light to the display panel;
    a middle mold positioned between the display panel and the light source; and a quantum dot sheet positioned between the display panel and the middle mold and configured to convert a wavelength of light emitted from the light source, wherein the middle mold comprises
- a middle mold frame; and
- a color compensator positioned to face the quantum dot sheet to provide uniform white light to outside of the display panel, and configured to have a light transmittance that is higher than a light transmittance of the middle mold frame, wherein the quantum dot sheet is positioned on an upper surface of the color compensator, the upper surface facing the display panel.

16. The display apparatus of claim 15, wherein the middle mold frame is formed of an opaque material, and the color compensator is formed of a semitransparent material.

17. The display apparatus of claim 15, wherein the middle mold frame and the color compensator are formed of a material in which resin and white coloring agents are mixed with each other, and wherein a content of the white coloring agents forming the color compensator is less than a content of the white coloring agents forming the middle mold frame.

18. The display apparatus of claim 17, wherein the resin comprises any one or any combination of Polycarbonate (PC) resin, Acrylonitrile Butadiene Styrene (ABS) resin and Polybutylene Terephthalate (PBT) resin.

19. The display apparatus of claim 15, wherein the quantum dot sheet is positioned on the middle mold.

20. The display apparatus of claim 15, wherein the color compensator is positioned on the middle mold frame and is in contact with the quantum dot sheet.

* * * * *